June 23, 1953     F. A. KROHM     2,642,843
AIR FILTER
Filed Sept. 19, 1949
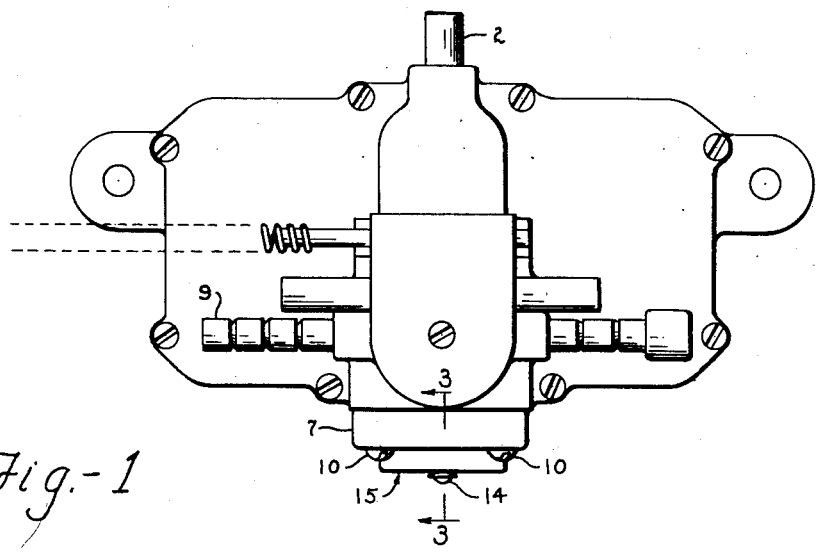
Fig.-1
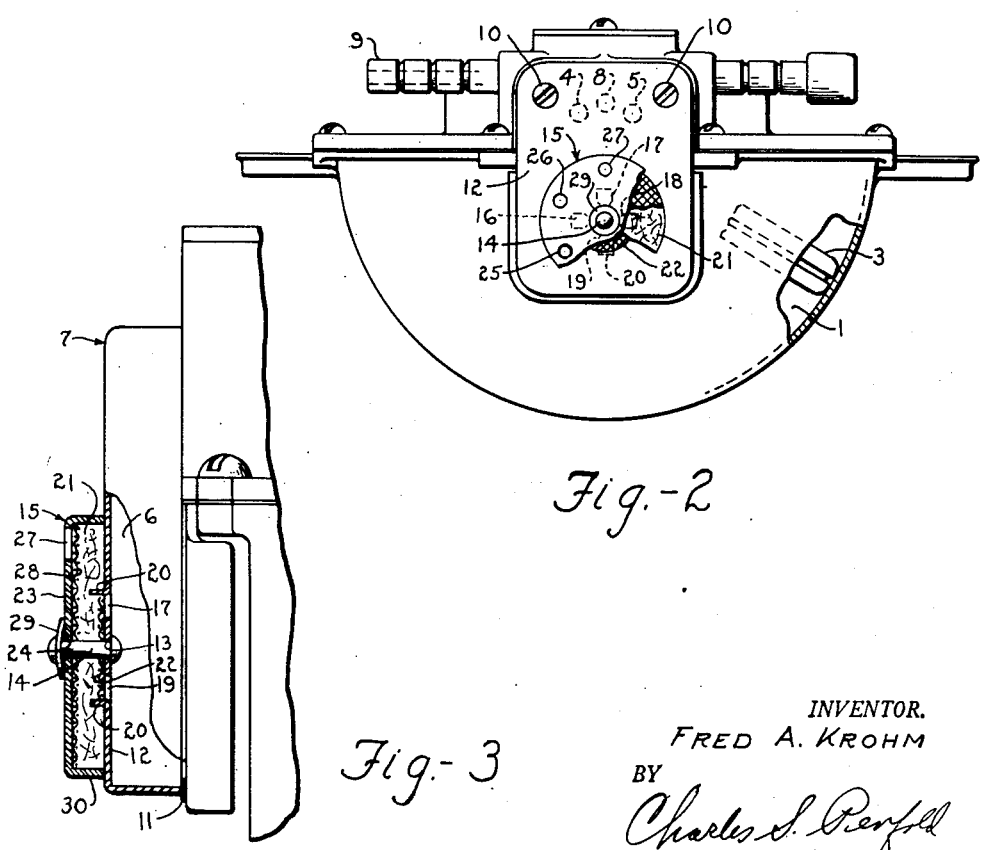
Fig.-2
Fig.-3
INVENTOR.
FRED A. KROHM
BY
Charles S. Penfold
ATTORNEY Patented June 23, 1953

2,642,843

UNITED STATES PATENT OFFICE 2,642,843

AIR FILTER

Fred A. Krohm, Gary, Ind., assignor to Productive Inventions, Inc., a corporation of Indiana Application September 19, 1949, Serial No. 116,529

7 Claims. (Cl. 121—1)

1

This invention relates generally to filters and more particularly is directed to a filter assembly or device adapted for use with a fluid operated motor such as a windshield wiper motor.

Motors of this class generally have a chamber within which a vane or piston oscillates, fluid or air passages communicating with the chamber on opposite sides of the vane, automatic valve operating mechanism for controlling the flow of fluid through the passages to obtain pressure differentials to actuate a drive shaft supporting the vane, and a filter for filtering the air as it is introduced or inhaled into a compartment communicatively connected with the chamber.

The primary object of the subject invention is to provide a filter assembly embodying improved principles of design and construction for prolonging the efficiency and life of the motor.

An important object of the invention is to provide a filter assembly in which the filter is so arranged that after one portion or section of the filter has served its purpose by becoming substantially impregnated with dust or other foreign matter, another clean or new section thereof may be utilized. More specifically in this respect, the filter assembly preferably includes a support provided with an opening, a filter disposed over the opening, and a manually controlled holder for the filter carried by the support and adapted for movement so that when required different portions or sections of the filter may be employed for filtering the air as it passes to the opening. This arrangement has the distinct advantage that one filter will effectively serve the purpose of several individual filters. Heretofore, the practice has been to remove the filter member when no longer serviceable and replace it with a new one.

A significant object of the invention is to provide the filter assembly with a pair of screens. One screen serves to prevent any residue or fibers of the filter from passing through the opening into the compartment, and thereby maintain the automatic valve operating mechanism and passages in the motor in a clean condition. The other screen primarily serves to prevent the filter material from projecting outwardly through an air inlet port provided in the movable holder.

A particular object of the invention is to provide the filter assembly with resilient means for maintaining the filter and filter holder in engagement with the support.

A further object of the invention is to provide a filter device in which the holder can be readily manipulated and automatically held in any one of an infinite number of different operative positions.

2

Another object of the invention is to provide a unique filter assembly which readily lends itself to installation on various models or types of motors.

Additional objects of the invention reside in its simplicity of design and construction, economy of construction and assembly on a volume production basis, efficiency in operation, ease of adjustment, and durability.

Other objects and advantages of the invention will become apparent after the description hereinafter set forth is considered in conjunction with the drawings annexed hereto.

In the drawings,

Figure 1 is a top view of a fluid operated motor adapted for use in driving a wiper arm and blade across a windshield, with the filter assembly embodying the invention attached to the motor;

Figure 2 is a front view of the motor showing the attached filter assembly, portions of the latter being broken away to exemplify details of construction; and Figure 3 is an enlarged vertical section taken substantially on line 3—3 of Figure 1.

The motor, among other things, includes a chamber 1, a shaft 2, and a vane or piston 3 carried by the shaft. A wall of the motor housing is provided with a pair of passageways 4 and 5 which communicate with the chamber on opposite sides of the vane and open into a compartment 6 formed by a cover 7 of the filter assembly. The motor housing is further provided with a passage 8 between passages 4 and 5 which communicates with a vacuum supply through a nipple 9. Automatic valve operating mechanism, not shown, is adapted for disposition in the compartment for alternatively communicatively connecting the passages 4 and 5 with supply passage 8. More specifically, while one side of the vane is being subjected to the vacuum side of the system, air from the atmosphere will be drawn into the chamber at the other side of the vane from the compartment 6. Oscillation of the vane will correspondingly oscillate the shaft and a wiper arm adapted to be mounted thereon.

The filter assembly embodying the subject invention serves to filter air entering the compartment prior to its introduction into the motor chamber. As clearly illustrated, it includes, among other things, the cover 7 above referred to. This cover provides a support for the filter device and is preferably made in the form of a generally rectangular cup or shell so as to house the automatic valve operating mechanism. This cover or support may be attached to the motor in any suitable manner but as herein illustrated it is connected thereto and over the passages 4, 5 and 8 by a pair of screws 10 so that marginal edge portions of the cover may be drawn against a gasket 11 to make the compartment substantially fluid tight.

The front planar wall 12 of the cover is provided with a center aperture 13 through which a rivet pivot 14 extends for rotatably supporting a filter holder 15. As illustrated in Figures 2 and 3, the cover is further provided with a plurality of round openings 16, 17, 18 and 19 of predetermined size which are preferably equally spaced apart and circumferentially arranged about and in relatively close proximity to the pivot 14. These openings are preferably formed by striking portions 20 of the wall 12 outwardly into a filter 21 for anchoring or locking the filter to the cover 7. The filter preferably is substantially round and planar in character and comprised of fibrous material, such as felt, which may be dry or oiled, and is seated in the holder and over or across the openings 16, 17, 18 and 19. A small round screen 22 is interposed between the filter and wall 12 and centrally located over the openings just referred to by the locking portions 20. This screen as stated above serves to prevent any residue or fibers of the filter from clogging the passages 4, 5 and 8 and interference with the proper movement of the components of the automatic valve operating mechanism.

The holder 15 is preferably made in the form of a round cup, the planar front or base wall 23 of which is provided with a hole 24, through which the rivet 14 extends. This front wall is also provided with a plurality of equally spaced apart air inlet ports, including ports 25, 26 and 27.

It will be noted that the radial distance between the inlet ports and the axis of the pivot 14 is somewhat greater than the radial distance between the openings and such axis, the purpose of which is to cause the air to travel a devious route or path through the filter assembly and an appreciable radial distance through the filter material. The filter material is normally of a thickness both greater than the depth of the holder and the distance between the outer face of the front cover wall 12 and the inner face of the front holder wall 23 so that when the ends of the rivet 14 are upset, as shown, the filter will be compressed.

A round screen 28 of a size greater than screen 22 is preferably interposed between the front wall 23 of the holder and the filter to prevent any of the filter material from projecting outwardly through the inlet ports to interfere with rotating the holder relative to the filter. The screen 28 also serves as a bearing for the inner surface of the front wall of the holder. It will be noted that each screen is provided with a center aperture through which the rivet 14 extends. It will be further noted that since the filter is compressed the screens will automatically seat and anchor themselves to the filter.

Resilient means, preferably in the form of a spring washer 29 is mounted on the rivet between its outer upset end and the front wall of the holder for the purpose of maintaining the marginal edge of the axial or peripheral wall 31 of the holder including the filter and screen 22 in engagement with the front wall 12 of the cover. With this arrangement, the axial wall 31 of the holder is always held in a sealed relationship with the cover so that all air that is admitted to the compartment 6 must first enter through the air inlet ports such as 25, 26 and 27 provided in the front wall 23 of the holder.

In view of the foregoing it will be evident that the compartment is substantially fluid tight, except for the openings underlying the filter, and that when the motor is operating, air from the atmosphere will be caused to first travel axially through the air inlet ports of the holder, then in a substantially radial direction between the planar outer walls of the cover 7 and holder 15 and through the filter for an appreciable distance and finally rearwardly in an axial direction through the openings 16 through 19 of the cover into the compartment 6. Due to the change in the course of travel the air will be well filtered prior to its introduction into the compartment. More specifically in this respect, when the filter is positioned, as illustrated in Figures 2 and 3, some air will enter the uppermost port 27 in the holder and travel in a centripetal direction through the filter to the opening 17 in the cover in substantially the same manner that air will travel through other portions of the filter from the remaining ports to openings 16, 18 and 19. After the motor has been operated for a period of time, such portions of the filter will in some measure become filled or clogged with dirt and other foreign matter. When this condition exists, it is merely necessary to grasp the holder and rotate it a few degrees, whereupon air will enter the ports and travel substantially radially through portions of the filter not previously subjected to air. Thus, when desired, unused and relatively clean portions of the filter may be presented to the air. This filter also serves to muffle or dampen any noise due to the circulation of air through the ports, openings or passages and/or resulting from the operation of the automatic valve mechanism.

As pointed out above the parts are so constructed and arranged that the holder will be automatically held in any one of an infinite number of rotative positions. Such holding action is primarily due to friction arising between the holder, filter material and screen 28 and between the holder and cover; such friction being augmented by the resilient means 29.

Although the invention operates as above described it is to be understood that it can also be advantageously practiced by rearranging the parts so that the holder and filter as a unit may be caused to rotate with respect to the cover, in which event different portions or sections of the filter may be utilized.

While I have shown and described the preferred construction of my invention, I contemplate that numerous and extensive departures may be made therefrom without departing from the spirit of my invention and the scope of the appended claims.

I claim:

1. A subassembly for a fluid operated motor comprising a support provided with an opening, a member connected to the support, and a filter disposed between the support and member, said member while connected to the support being readily movable so that one portion of the filter may be utilized to filter air adapted to pass to the opening and then another portion may be used for the same purpose.

2. A subassembly for a fluid operated motor comprising a support provided with an opening, a holder member connected to the support, a plurality of ports provided in the holder member, and a filter member arranged in the holder member and disposed over the opening and compressed between the holder member and support, the relationship between the opening and ports being such that while the support and holder member are connected one member is moved to one position, fluid will be caused to travel through one portion of the filter from one port to the opening and when moved to a different position, fluid will be caused to travel through another portion of the filter from another port to the opening.

3. A subassembly for a fluid operated motor comprising a support provided with a pivot and a plurality of openings arranged in relatively close proximity about the pivot, an annular cup mounted on the pivot, a plurality of ports provided in the cup spaced radially from the openings, and a filter seated in the cup and bearing against the support, said cup being rotatable whereby the ports may be moved relative to the openings so that fluid may be caused to successively travel through different portions of the filter when desired.

4. A subassembly for a fluid operated motor including a support provided with an opening, and a filter device connected to the support and comprising relatively movable parts arranged with respect to the opening in a manner whereby while connected to the support relatively clean filter sections may be selected to filter air when it passes through the opening.

5. A subassembly for a fluid operated motor comprising a support provided with an opening, a member mounted on said support in spaced relationship thereto, a relatively flat filter disposed in the space and over the opening, a screen engaging one side of the filter, and a port provided in the member at a point remote from the opening so that fluid passing through the filter and screen from the port to the opening will be caused to travel a devious route.

6. A subassembly for a fluid operated motor comprising a support provided with an opening, a member movably mounted on the support, a port provided in the member, and a filter disposed between the support and member in a manner whereby the member may be first moved to one position so that air will be filtered through one portion of the filter as it passes from the port to the opening and then to a different position so that air will pass through another relatively cleaner portion of the filter.

7. A filter device adapted for association with a fluid operated motor provided with an opening for fluid, said device comprising a filter member and a member provided with a port, said device while continuously associated with a motor being operable so that one portion of the filter member may be utilized to filter fluid when passing from the port to the opening and then another cleaner portion of the filter member may be used for the same purpose.

FRED A. KROHM.

References Cited in the file of this patent

UNITED STATES PATENTS

| Number | Name | Date |
| --- | --- | --- |
| 1,944,279 | Skelton | Jan. 23, 1934 |
| 2,144,681 | Kraissl, Jr. | Jan. 24, 1939 |
| 2,175,195 | Irvine | Oct. 10, 1939 |
| 2,178,033 | Decker | Oct. 31, 1939 |
| 2,260,853 | Hueber | Oct. 28, 1941 |
| 2,482,679 | McAllister et al. | Sept. 20, 1949 |
| 2,484,548 | Bitzer | Oct. 11, 1949 |